United States Patent [19]
Lee

[11] Patent Number: 5,970,859
[45] Date of Patent: Oct. 26, 1999

[54] HAND-OPERATED JUICER

[76] Inventor: Ming-Hsiang Lee, No. 4, Lane 263, Sec. 2, Chien-Kong Rd., Tainan, Taiwan

[21] Appl. No.: 09/316,237

[22] Filed: May 21, 1999

[30] Foreign Application Priority Data

Jul. 8, 1998 [TW] Taiwan .................................. 87210980

[51] Int. Cl.6 ............................. A23N 1/00; A47J 19/02
[52] U.S. Cl. .................................. 99/507; 99/506; 99/508
[58] Field of Search ............................. 99/495, 501–508, 99/595; 100/97, 234, 288, 98 R, 103, 131, 902; 210/307, 335, 470, 514

[56] References Cited

U.S. PATENT DOCUMENTS

| | | | |
|---|---|---|---|
| 1,115,754 | 11/1914 | Walker | 99/507 |
| 2,018,932 | 10/1935 | Thorne | 99/508 X |
| 2,042,341 | 5/1936 | Ilgenfritz | 99/506 X |
| 2,099,170 | 11/1937 | Majewski, Jr. | 99/495 X |
| 2,160,523 | 5/1939 | Scurlock | 99/507 |
| 2,238,571 | 4/1941 | Scott | 99/508 X |
| 2,497,335 | 2/1950 | Wissner | 99/495 X |
| 2,674,182 | 4/1954 | Kirkpatrick | 100/98 R |
| 2,786,502 | 3/1957 | Turner | 100/288 X |
| 4,530,277 | 7/1985 | Matsumoto | 100/131 X |
| 5,084,177 | 1/1992 | Keene | 210/514 |
| 5,510,028 | 4/1996 | Kuhlman | 210/307 |
| 5,520,105 | 5/1996 | Healy | 100/98 R |

Primary Examiner—Timothy Simone
Attorney, Agent, or Firm—Trop, Pruner, Hu & Miles, P.C.

[57] ABSTRACT

A hand-operated juicer includes a base, an upright support mounted on the base, an upper squeeze unit that is connected to an upper end of the upright support, and a lower squeeze unit that is disposed below the upper squeeze unit above the base. The upper squeeze unit has a manually operable rod member and a squeeze cap that is connected to a lower end of the rod member. The rod member is movable vertically to enable the squeeze cap to abut against the lower squeeze unit. The squeeze cap is made of stainless steel, and has an upper socket portion, a lower skirt portion diverging downwardly from the upper socket portion, and a tubular adaptor that is mounted removably in the upper socket portion and that is connected detachably to the lower end of the rod member.

4 Claims, 4 Drawing Sheets

HAND-OPERATED JUICER

BACKGROUND OF THE INVENTION

1. Field of the Invention

This invention relates to a hand-operated juicer, more particularly to a hand-operated juicer that has a corrosion-resistant squeeze cap.

2. Description of the Related Art

A conventional hand-operated juicer includes a base, an upright support connected to the base, an upper squeeze unit connected to an upper end of the upright support, and a lower squeeze unit fixed to the upright support below the upper squeeze unit. The upper squeeze unit has a rod member and an aluminum squeeze cap connected to a lower end of the rod member. The rod member is operable manually to move the squeeze cap vertically with respect to the lower squeeze unit in order to squeeze fruit disposed on the lower squeeze unit. Since the fruit juice often contains acidic substances, the surface of the squeeze cap is easily corroded, thereby affecting the appearance of the squeeze cap. In addition, since the squeeze cap is fixed to the rod member, cleaning of the dirt that is accumulated in a clearance formed between an upper socket portion of the squeeze cap and the lower end of the rod member is difficult to conduct.

SUMMARY OF THE INVENTION

The object of the present invention is to provide a hand-operated juicer having a squeeze cap that is acid resistant.

According to the present invention, the hand-operated juicer includes a base, an upright support mounted on the base, an upper squeeze unit that is connected to an upper end of the upright support, and a lower squeeze unit that is disposed below the upper squeeze unit above the base. The upper squeeze unit has a manually operable rod member and a squeeze cap that is connected to a lower end of the rod member. The rod member is movable vertically to enable the squeeze cap to abut against the lower squeeze unit. The squeeze cap is made of stainless steel, and has an upper socket portion, a lower skirt portion diverging downwardly from the upper socket portion, and a tubular adaptor that is mounted removably in the upper socket portion and that is connected detachably to the lower end of the rod member.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
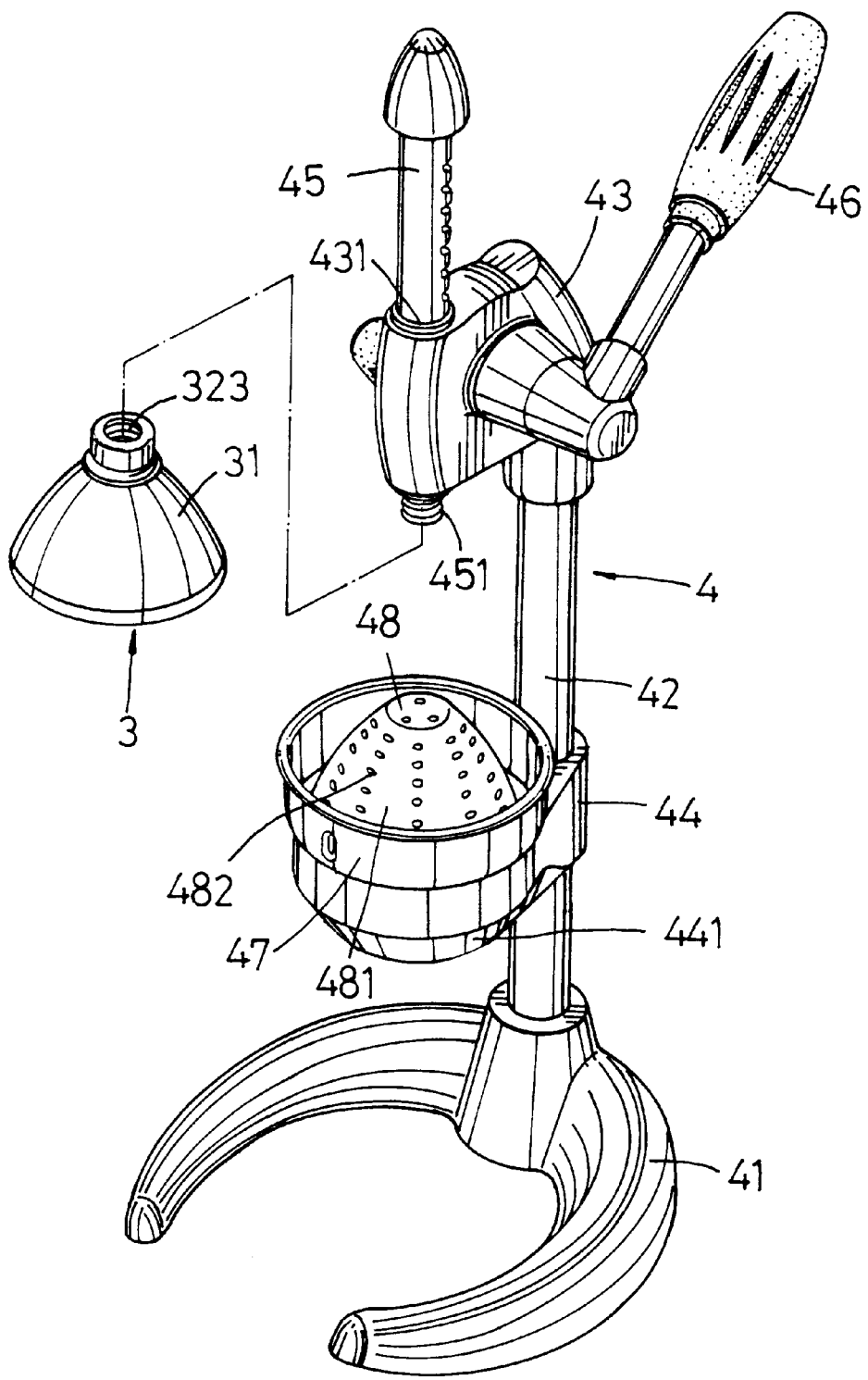
FIG. 1 is a partly perspective view of a preferred embodiment of a hand-operated juicer according to the present invention.
Figure 2:
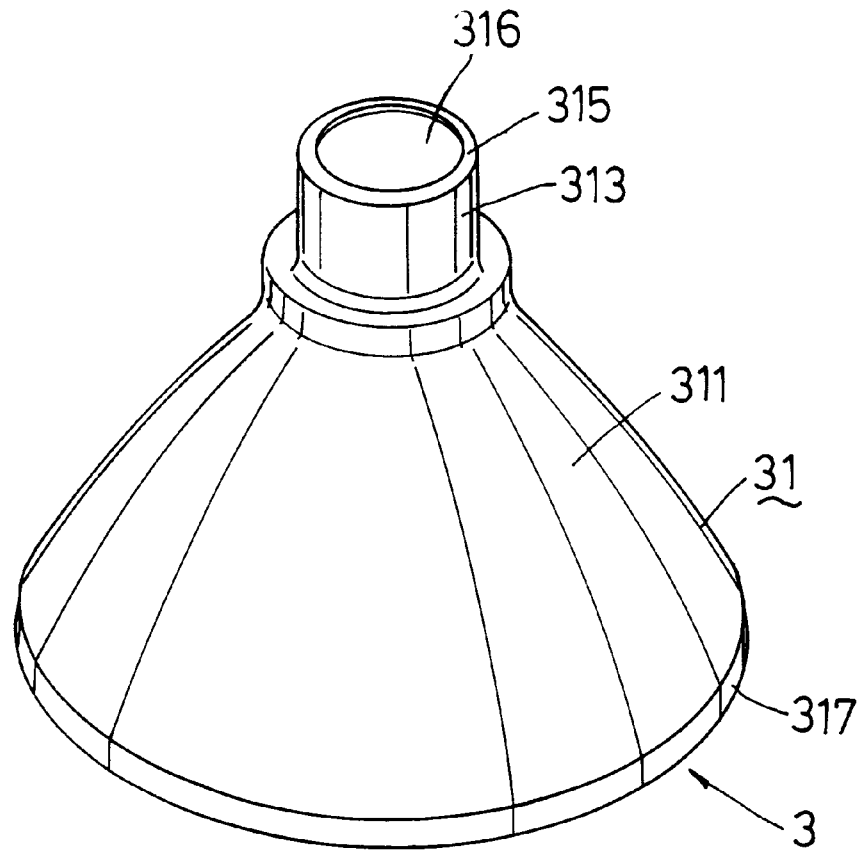
FIG. 2 is an exploded view of a squeeze cap of the preferred embodiment of the hand-operated juicer according to the present invention.
Figure 2:
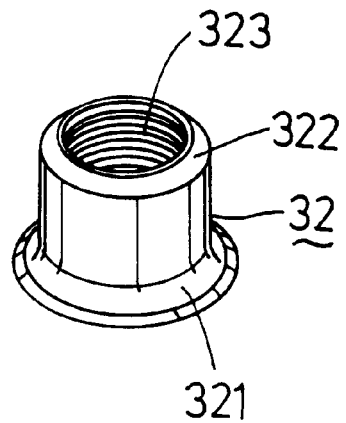

Referring to FIGS. 1 and 2, a preferred embodiment of a hand-operated juicer 4 according to the present invention is shown to includes a base 41, an upright support 42 fixed on the base 41, an upper squeeze unit 43 that is connected to an upper end of the upright support 42, and a lower squeeze unit 44 that is connected to the upright support 42 below the upper squeeze unit 43. The upper squeeze unit 43 has a vertical through hole 431, a rod member 45 that is received in the vertical through hole 431 and that is parallel to the upright support 42, and a squeeze cap 3 that is connected to a lower end 451 of the rod member 45. The lower end 451 of the rod member 45 is provided with an external thread. The rod member 45 is operable manually via an actuating lever 46 to move vertically so as to enable the squeeze cap 3 to abut against the lower squeeze unit 44. The lower squeeze unit 44 includes a support base portion 441, a container 47 disposed on the support base portion 441, and a squeeze screen 48 against which the squeeze cap 3 abuts when the rod member 45 is moved downwardly. The squeeze screen 48 includes a convex body 481 and a plurality of apertures 482 formed in the convex body 481.

Figure 3:
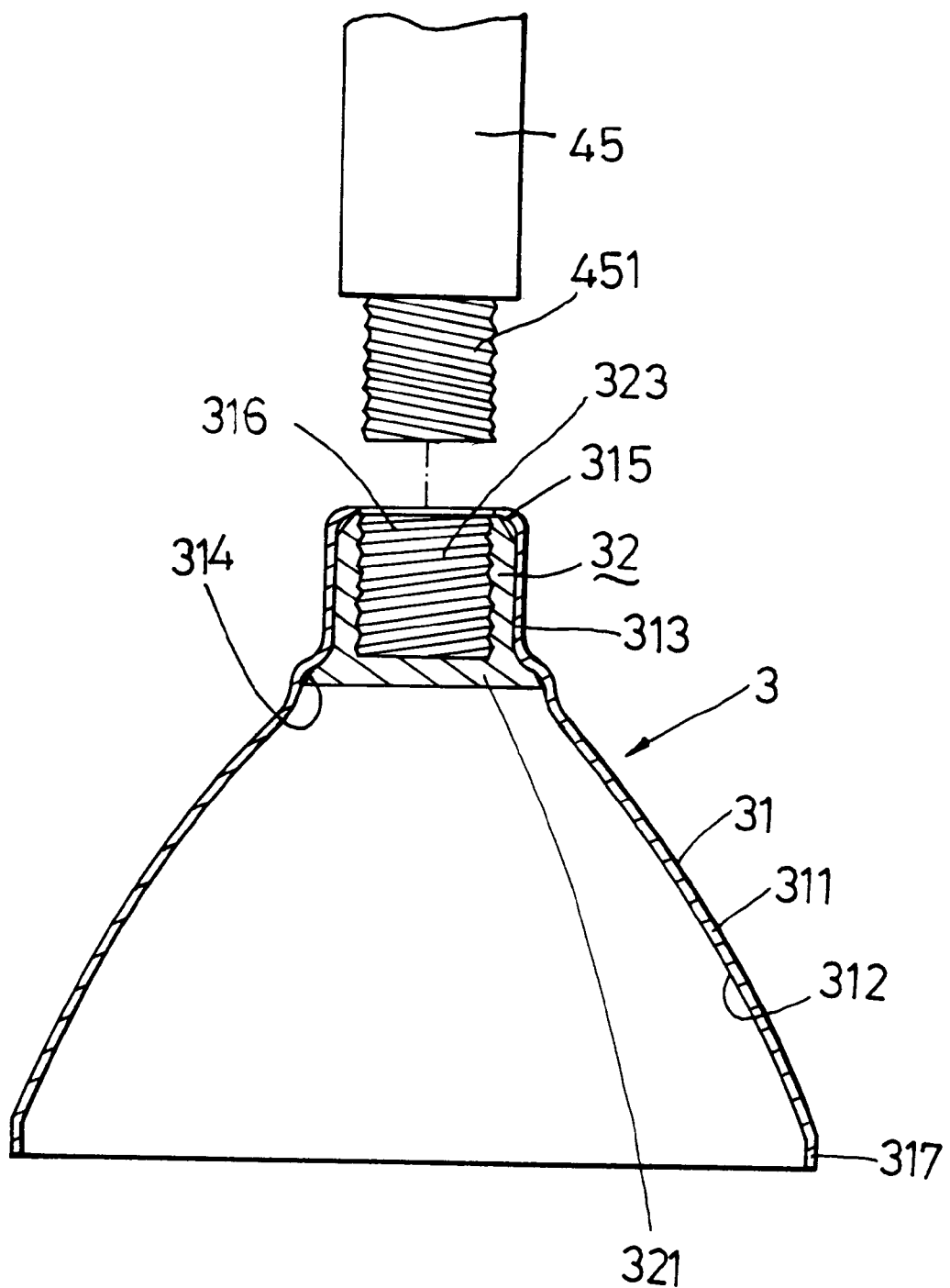
FIG. 3 is a fragmentary exploded sectional view illustrating how the squeeze cap engages a rod member of the preferred embodiment of the hand-operated juicer of the present invention.

Referring to FIGS. 2 and 3, the squeeze cap 3 includes a cap body 31 and a tubular adaptor 32. The cap body 31 is formed by pressing a sheet of stainless steel and has an upper socket portion 313, a lower skirt portion 311 diverging downwardly from the upper socket portion 313, and a shoulder portion 314 formed on an inner wall face 312 between the upper socket portion 313 and the lower skirt portion 311. The inner wall face 312 is configured to engage complementarily the convex body 481 of the squeeze screen 48. The upper socket portion 313 has an inwardly extending flange 315 formed at an upper end thereof and a through hole 316 formed therein. The lower skirt portion 311 has an annular lip portion 317 depending from the lower edge thereof.

The adaptor 32 is made of stainless steel powder with an excellent acid-resistance characteristic by means of a metallurgical process. The adaptor 32 is mounted removably in the upper socket portion 313, and has a central threaded hole 323 that engages threadedly the external thread of the lower end 451 of the rod member 45. The adapter 32 has an upper end 322 that abuts against the inwardly extending flange 315 of the upper socket portion 313, and an outwardly extending flange 321 that is formed at a lower end of the adaptor 32 and that abuts against the shoulder portion 314.

Since the squeeze cap 3 is made of an acid-resistant stainless steel material, the squeeze cap 3 can be protected from acid corrosion. In addition, because the squeeze cap 3 is detachable from the rod member 45, it can be easily cleaned.

Figure 4:
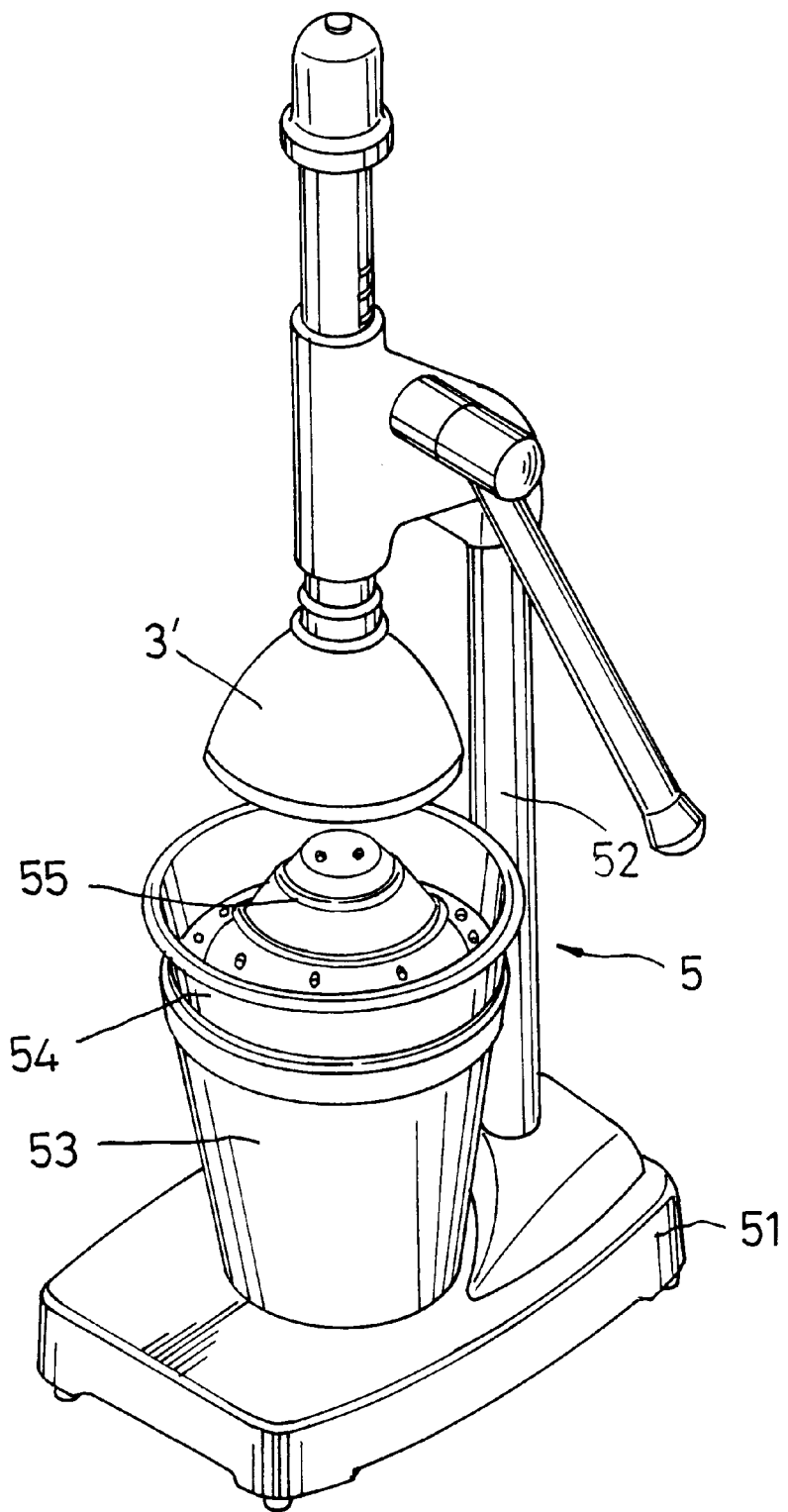
FIG. 4 is a perspective view of a second preferred embodiment of a hand-operated juicer according to the present invention.

Referring to FIG. 4, a second preferred embodiment of a hand-operated juicer 5 according to the present invention is shown to comprise a squeeze cup 3', a base 51, an upright support 52 fixed on the base 51, and a container 53 disposed on the base 51 for receiving juice. The container 53 has a support base portion 54 disposed thereon. The support base portion 54 has a squeeze screen 55 disposed thereon. The squeeze cup 3' is disposed correspondingly over the squeeze screen 55.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A hand-operated juicer comprising a base, an upright support mounted on said base, an upper squeeze unit that is connected to an upper end of said upright support, and a lower squeeze unit that is disposed below said upper squeeze unit above said base, said upper squeeze unit having a manually operable rod member and a squeeze cap that is connected to a lower end of said rod member, said rod member being movable vertically to enable said squeeze cap to abut against said lower squeeze unit, said squeeze cap being made of stainless steel and having an upper socket portion, a lower skirt portion diverging downwardly from said upper socket portion, and a tubular adaptor that is mounted removably in said upper socket portion and that is connected detachably to said lower end of said rod member.

2. The hand-operated juicer as claimed in claim 1, wherein said upper socket portion has an inwardly extending flange formed at an upper end thereof, said adaptor having an upper end abutting against said inwardly extending flange.

3. The hand-operated juicer as claimed in claim 2, wherein said squeeze cap has a shoulder portion formed on an inner wall face thereof between said upper socket portion and said lower skirt portion, said adaptor having an outwardly extending flange formed at a lower end thereof, said outwardly extending flange abutting against said shoulder portion.

4. The hand-operated juicer as claimed in claim 3, wherein said lower end of said rod member has an external thread, said adaptor having a threaded hole for engaging said external thread of said rod member.

\* \* \* \* \*